United States Patent [19]

Normann et al.

[11] Patent Number: 4,775,327
[45] Date of Patent: Oct. 4, 1988

[54] CONNECTOR WITH AUTOMATIC PROTECTION CAP

[75] Inventors: Richard W. Normann, Otego; James R. Hall, Bainbridge, both of N.Y.

[73] Assignee: Amphenol Corporation, Wallingford, Conn.

[21] Appl. No.: 15,395

[22] Filed: Feb. 17, 1987

[51] Int. Cl.⁴ .................................. H01R 13/44
[52] U.S. Cl. ................................ 439/140; 439/145
[58] Field of Search ........................ 439/137–140, 439/145, 259, 263, 299, 347, 370, 376

[56] References Cited

U.S. PATENT DOCUMENTS

| | | | |
|---|---|---|---|
| 3,465,280 | 9/1969 | Paganelli | 439/140 |
| 4,109,989 | 8/1978 | Snyder et al. | 439/140 |
| 4,149,027 | 4/1979 | Asher et al. | 439/137 |
| 4,475,784 | 10/1984 | Lukawich | 439/138 |
| 4,493,517 | 1/1985 | Hillary | 439/137 |
| 4,514,024 | 4/1985 | Clark | 439/139 |
| 4,592,609 | 6/1986 | Kasai et al. | 439/140 |
| 4,695,925 | 9/1987 | Kodai et al. | 439/137 |

Primary Examiner—Gil Weidenfeld
Assistant Examiner—Paula A. Austin
Attorney, Agent, or Firm—Bacon & Thomas

[57] ABSTRACT

An automatic protection cap assembly for plug and receptacle connectors including a laterally fixed apertured plate and a laterally slidably apertured plate in each connector. The plates of the receptacle connector are axially movable. Opening and closing cams having inclined ramp surfaces are fixed on laterally opposite sides of the housing of the receptacle. A latch mounted on the slide plate of the receptacle is insertable into a latch recess in the plug housing, and the latch and latch recess cooperate for moving the slide plate to its closed position by axially moving the plate assembly of the receptacle upon demating of the assembly.

22 Claims, 12 Drawing Sheets

CONNECTOR WITH AUTOMATIC PROTECTION CAP

BACKGROUND OF THE INVENTION

1. Field of the Invention

This invention relates to an electrical or optical connector in which the mating ends of its electrical or optical contacts are protected when the connector is not mated.

2. Description of the Prior Art

A releasable electrical or optical connector assembly includes a plug connector, a receptacle connector, and a plurality of contacts each mounted in one of the connectors and respective pairs of which being adapted to mate with one another when the connectors are mated. When either connector part is unmated the mating end of some of the contacts therein is exposed or otherwise unprotected. When used in some environments the mating end of the contacts could be subject to undesirable frequency interference, dust and/or moisture attack, or be bent or otherwise damaged.

Protection caps can be separately installed over the mating ends of the connector. Use of such apparatus is not always desirable because unless the cap is somehow secured to the connector the cap can be lost once it is removed from the connector.

To alleviate this problem, it has been suggested to provide a laterally slidable plate on the mating faces of the plug and receptacle connectors which overlie the contacts. The plates normally are in position to protect the contacts and are automatically moved into a non-blocking position when the connectors are mated by means of a single cam pin, mounted in the receptacle, which is provided with two acutely-angled ramp surfaces. One ramp surface is adapted to slide open the protective plate on the plug connector mating surface upon the initiation of the mating motion, and the second ramp surface is adapted to slide open the protective plate on the receptacle connector upon further insertion of the plug connector into the receptacle connector, following rearward axial movement of the receptacle plate against a spring bias. Both slide plates are spring biased to their blocking positions.

It has been found that the connector described above may not provide adequate protection of the contacts from dirt, etc. and the use of a single cam pin is undesirable. A single cam pin takes up valuable space in the field of the contacts and may be subject to damage as it is not an integral part of the mechanism.

In addition, connectors may remain in their mated state for some period of time, and may remain stuck together when they are attempted to be demated. This sticking may cause the slide plates to remain in their open position, and not automatically close when the connectors are demated.

It has also been found that there is the possibility of dirt entering the contact area when the slides are opened during the mating of two connectors, after the connectors have been in their protective state for some time in the field.

It would be desirable to provide an improved protection mechanism for a connector of the type described which alleviated the above problems.

SUMMARY OF THE INVENTION

In accordance with this invention, there is provided a connector assembly comprising mating plug and receptacle connectors, each connector comprising a housing terminating in a forward end, a contact support body mounted in the housing, contact elements mounted in the contact support body and extending towards the forward end of the connector, a protective plate assembly including a first plate laterally fixed in the housing and a second plate laterally slidable in the housing, each of the first and second plates having apertures which are offset from one another when the second plate is in a blocking position and the connectors are not mated, so as to protect the contact elements, the second plate being laterally movable upon mating of the connectors to a second position to position the apertures of the plates to be aligned with each other so as to permit coupling of the contact elements with respective contact elements of the other connector, an opening cam positioned on a lateral side of the housing of one of the connectors for camming the slide plates of each of the connectors to its second, open position, and closing means mounted in the housing of the one of the connectors at a position spaced from the opening cam for moving the slide plate of the one of the connectors to its first, blocking position upon demating of the connectors.

Further in accordance with this invention, there is provided a connector assembly comprising mating plug and receptacle connectors, each connector comprising a housing terminating in a forward end, a contact support body mounted in the housing, contact elements mounted in the contact support body and extending towards the forward end of the connector, a protective plate assembly including a first plate laterally fixed in the housing and a second plate laterally slidable in the housing, each of the first and second plates having apertures which are offset from one another when the second plate is in a blocking position and the connectors are not mated, so as to protect the contact elements, the second plate being laterally movable upon mating of the connectors to a second position to position the apertures of the plates to be aligned with each other so as to permit coupling of the contact elements with respective contact elements of the other connector, the protective plate assembly of one of the connectors being axially movable in its housing, and at least one latch mounted on the second plate of the one of the connectors and at least one latch recess provided in the other of the connectors for receiving the latch, the latch and latch recess cooperating in moving the protective plate assembly of the one of the connectors axially forward upon an axially outward movement of one of the connector associated with demating of the connector assembly.

Preferably, opening and closing cams are provided at laterally opposite internal sidewalls of the housing of the receptacle connector, and each cam is provided with an inclined ramp surface. Being integral with the housing, they are less susceptible to damage and since they are located away from the contact area, they do not take up valuable space in that area.

Furthermore, the latch and latch recess feature facilitates demating of the connector assembly after they have been in the mated condition in the field for an extended period of time.

Preferably, recesses are provided on the slide plates to prevent dirt from entering the connector housing when the slide plates are opened.

DESCRIPTION OF THE PREFERRED EMBODIMENTS

Figure 1:
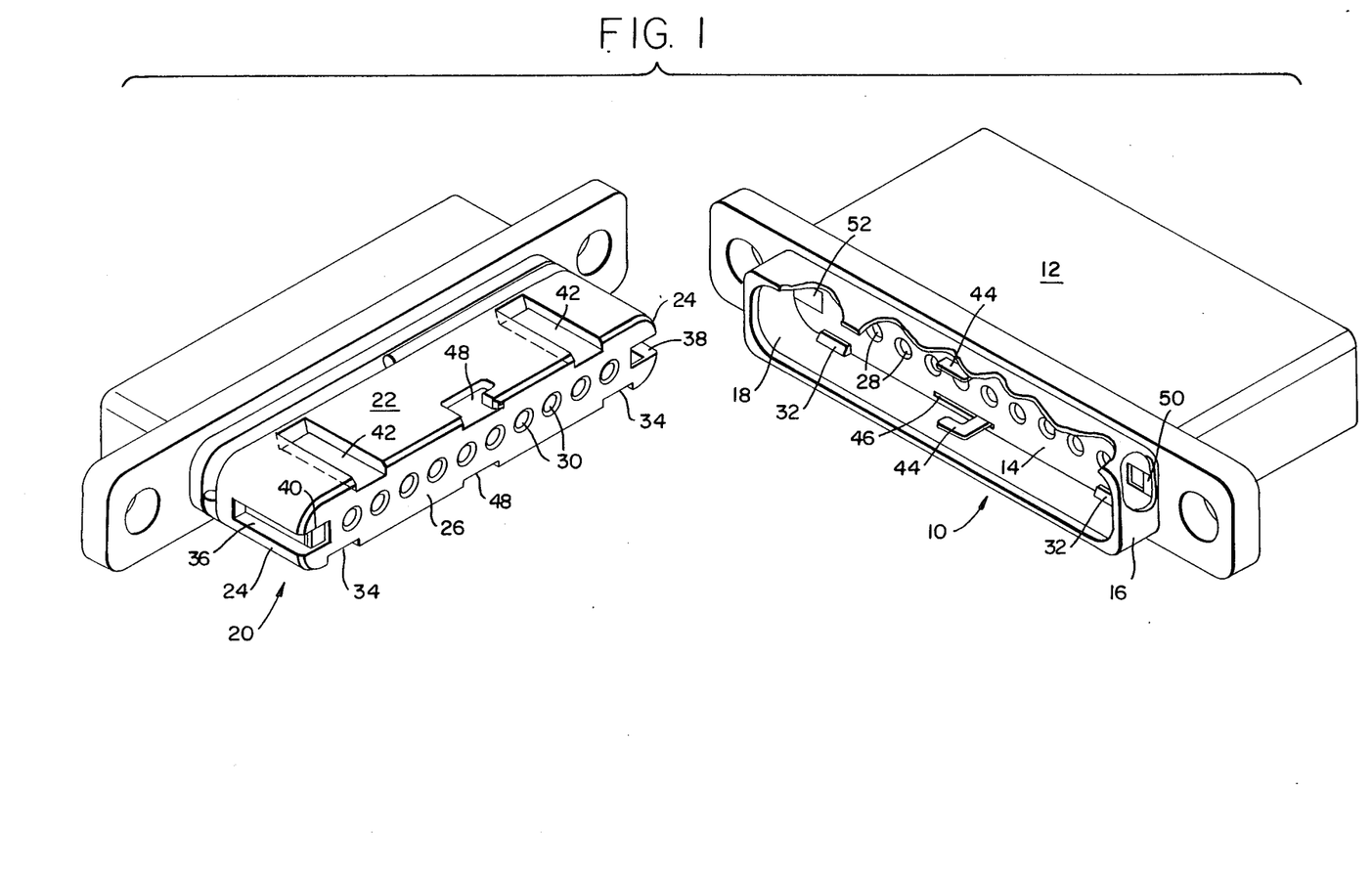
FIG. 1 is an isometric view, partially in section, of a plug connector and a receptacle connector positioned for mating.

As shown in FIG. 1, elongated receptacle connector 10 has a generally rectangular housing 12 and a front mating face 14. The front portion of housing 12 includes a sidewall 16 which defines a recess 18 to receive a plug connector 20 shown in the left hand side of the figure. Plug connector 20 likewise is an elongated connector having a generally rectangular housing 22, side walls 24 at the front portion of housing 22 and a front mating surface 26. Housings 12, 22 may be formed of any suitable conductive or dielectric material. A plurality of apertures 28 is provided in receptacle 10 in any desired configuration, and a complementary plurality of apertures 30 is provided in plug 20, as more fully described below.

For alignment purposes during mating of receptacle 10 and plug 20, a set of keys and keyways are provided. Keys 32 are provided adjacent to front face 14 of receptacle 10 and are adapted to be inserted into keyways 34 on the lower portion of front face 26 of plug 20. To avoid reverse mating, a second set of keys (not shown) are provided on the upper side of face 14 of receptacle 10 and are adapted to engage with a second set of keyways 42 on the upper side of front face 26. As can be seen, keyways 34, 42 (as well as the two sets of keys) are arranged to be non-symmetrical to each other.

Latch arms 44 are provided in transverse slots 46 (only one of which is shown in FIG. 1) in receptacle 10 and have a general L-shape. Latch arms 44 are laterally movable in slots 46 and are adapted to be received in complementary L-shaped recesses 48 in plug 20. The purpose and movement of the latch arms are described below.

Grooves 36, 38 extend axially rearward in opposite sidewalls 24 of plug 20. An opening cam 50 is provided in receptacle 10, as is a closing cam 52. Cams 50-52 are adapted to be received, respectively, in grooves 36, 38.

Figure 2:
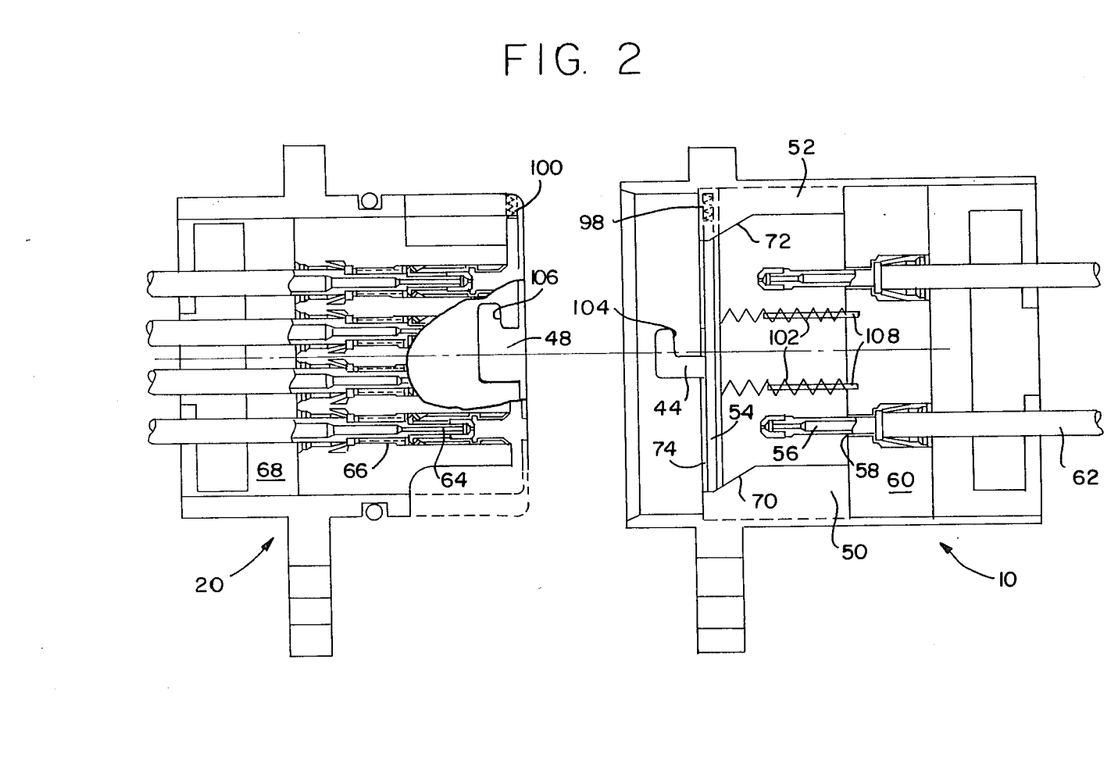
FIG. 2 is a plan view, partially in section, of the connectors of FIG. 1.

As shown in FIG. 2, a sliding plate 54 is mounted in receptacle 10, and latch arms 44 are attached to slide plate 54. Slide plate 54 is designed for lateral movement in receptacle 10, preferably against the bias of suitable springs 98.

Mounted in receptacle 10 in a conventional manner are a plurality of electrical and/or fiber optic contacts 56 in the form of pin contacts. Contacts 56 are mounted in a plurality of apertures 58 provided in an insert 60, which is formed of a dielectric material when the contacts are electrical contacts. The rearward end 62 of contacts 56 are terminated in a conventional manner.

A plurality of complementary electrical and/or fiber optic contacts 64 in the form of socket contacts are provided in plug 20. Contacts 64 are mounted in a plurality of apertures 66 in insert 68 of plug connector 20.

A cam arrangement is provided in receptacle 10 and includes the aforementioned opening cam 50 and closing cam 52. Both cams 50 and 52 include acute, inclined cam surfaces 70 and 72.

Figures 3, 4, 5:
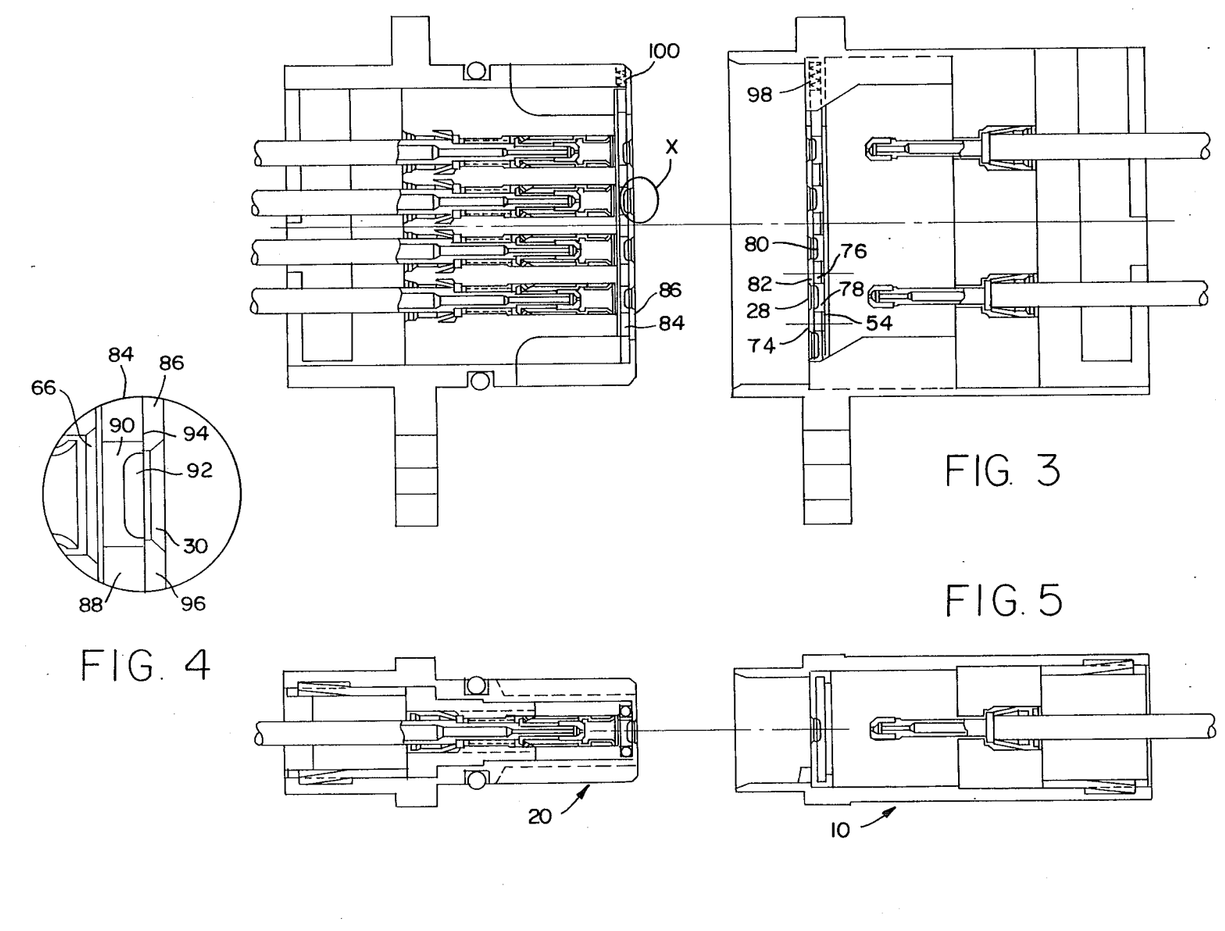
FIG. 3 is a view similar to FIG. 2, but with the latching arrangement removed for clarity.
FIG. 4 is an enlarged view of the area X in FIG. 3.
FIG. 5 is a side elevation view of the connector of FIG. 3.

Slide plate 54 is part of a slide assembly which includes a cover plate 74, shown also in FIG. 3. Cover plate 74 is fixed against lateral movement in receptacle 10. The slide assembly, however, is adapted for rearward axial movement against the bias of springs 102 which may be in the form of coil springs that are supported on guide pins 108 mounted in receptacle 10. Slide plate 54 includes a plurality of apertures 76 which are adapted to come into alignment with the front part of contacts 56 so as to expose the contacts when the connectors are mated. The sections 78 between apertures 76 in slide plate 54 are provided with recesses 80 in the front surface of slide plate 54. Fixed plate 74 includes the apertures 28 shown in FIG. 1, and sections 82 are defined between such apertures.

A slide plate 84 is likewise mounted in plug 20 for lateral movement against the bias of suitable springs 100. Forward of slide plate 84 is a fixed cover plate 86. Slide plate 84 is movable only laterally in plug 20. Apertures are also provided in these plates, as is more clearly seen in the enlarged view of FIG. 4. As shown therein, slide plate 84 includes openings 88 which are adapted to come into alignment with contacts 64 when slide plate 84 is moved to its open position. Sections 90 are defined between openings 88 and recesses 92 are provided in the front surface 94 of sections 90. Fixed plate 86 carries the openings 30 previously referred to, and has sections 96 between such openings. Slide plate 84 has an edge 40 for contact by opening cam 50.

The operation of the slide assemblies and cams will now be described with reference to FIGS. 3 and 6-11. In FIG. 3, the plug and receptacle connectors are positioned for mating. Slide plate 54 of receptacle 10 is in its normal blocking position, with sections 78 blocking entry to and providing protection for contacts 56. Openings 28 in fixed plate 74 are in axial alignment with both sections 78 and contacts 56. Sections 82 of fixed plate 74 are in alignment with apertures 76 in slide plate 54. Fixed plate 74 and slide plate 54 are in their forwardmost position.

In plug connector 20, sections 90 of slide plate 84 are in alignment with and protect contacts 64. Openings 30 in fixed plate 86 are aligned with sections 90. Sections 90 are covering up apertures 88 in slide plate 84, which is also in its normal blocking position. In this configuration, the contacts of both the plug and receptacle connectors are protected against intrusion of foreign objects and the like.

Figure 6:
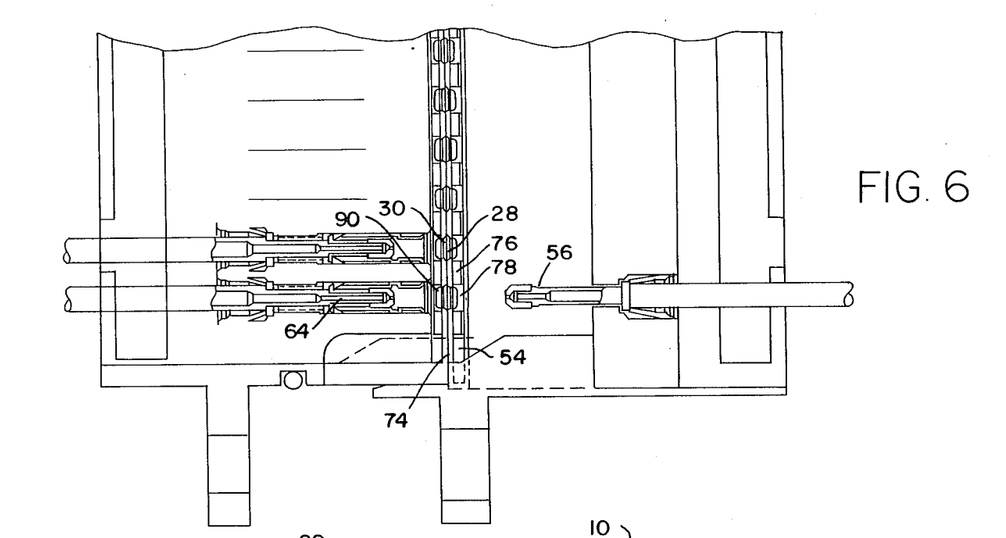
FIG. 6 is a view of the connectors of FIG. 3 during initial mating.
Figure 7:
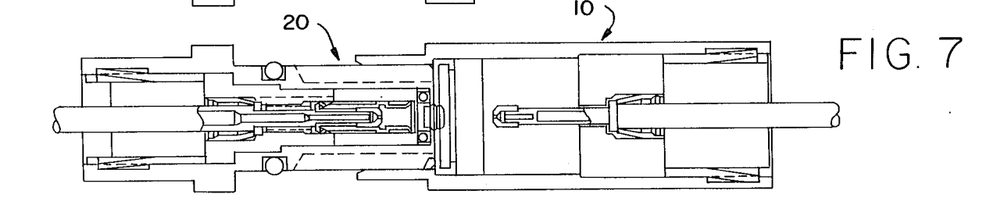
FIG. 7 is a side elevation view of FIG. 6.

In FIG. 6, the connectors are shown in the initial mating stage where the keys have entered into their respective keyways, so that mismating is prevented. When the connectors are properly aligned, apertures 28 of fixed plate 74 of receptacle 10 are in alignment with apertures 30 of fixed plate 86 of plug 20.

Figure 8:
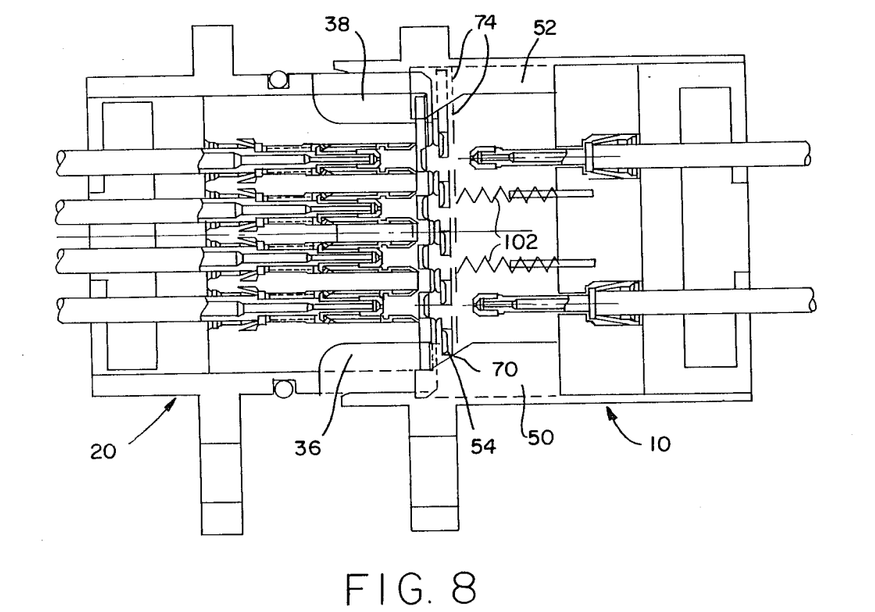
FIGS. 8-11 are views of the connectors moving towards each other during mating, to illustrate the movement of the slide plates.

FIG. 8 shows the next phase of the mating process, and some elements have been removed for clarity. Insertion of plug 20 into receptacle 10 forces the assembly of slide plate 54 and fixed plate 74 of receptacle 10 rearward in the connector against the bias of springs 102. The edge of slide plate 54 nearest ramp 70 of opening cam 50 rides up ramp 70 as the plate assembly is moved rearwards, causing slide 54 to start to move laterally (upwards in the drawing) to provide entry of the pin contacts. At this time, opening cam 50 and closing cam 52 start to enter into grooves 36, 38 in plug 20.

Figure 9:
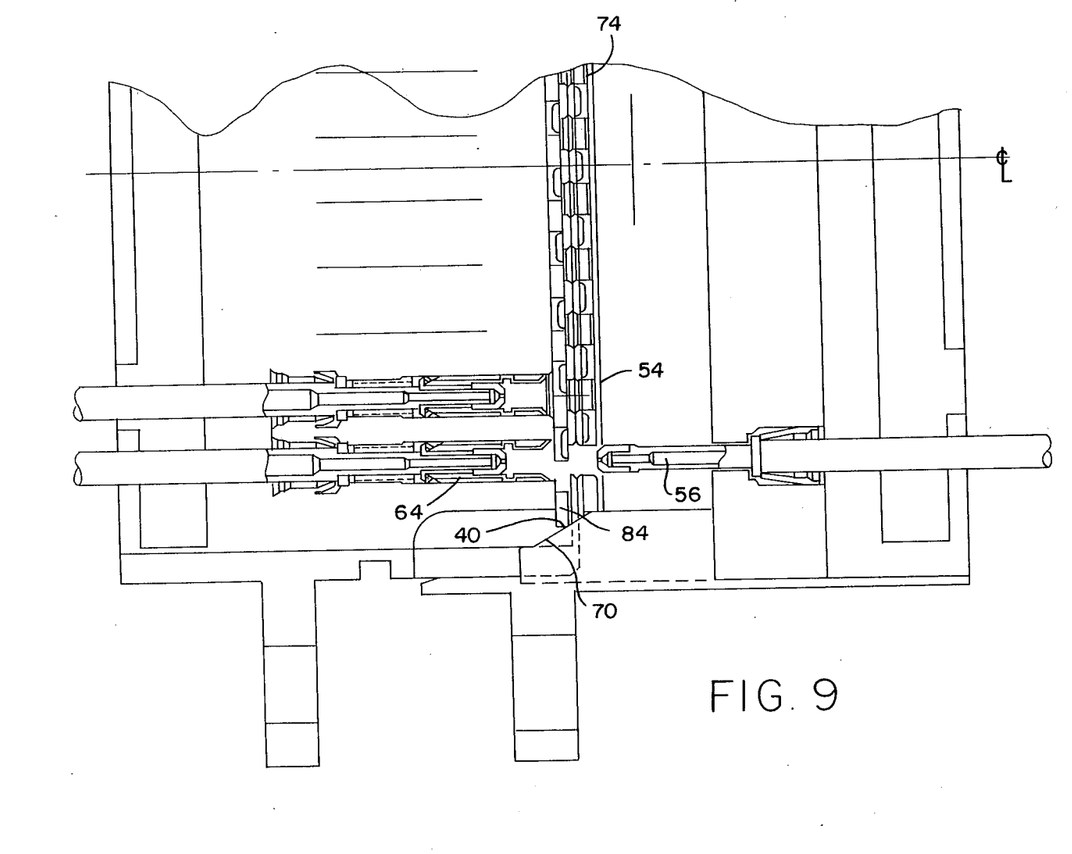
Figure 10:
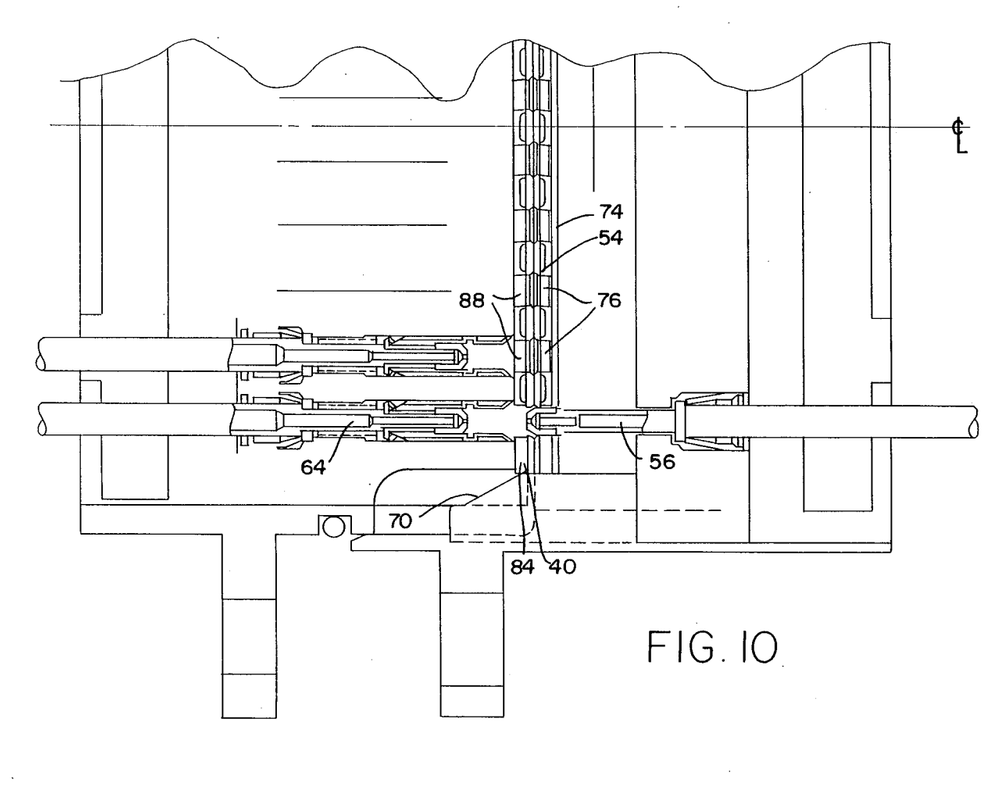
Figure 11:
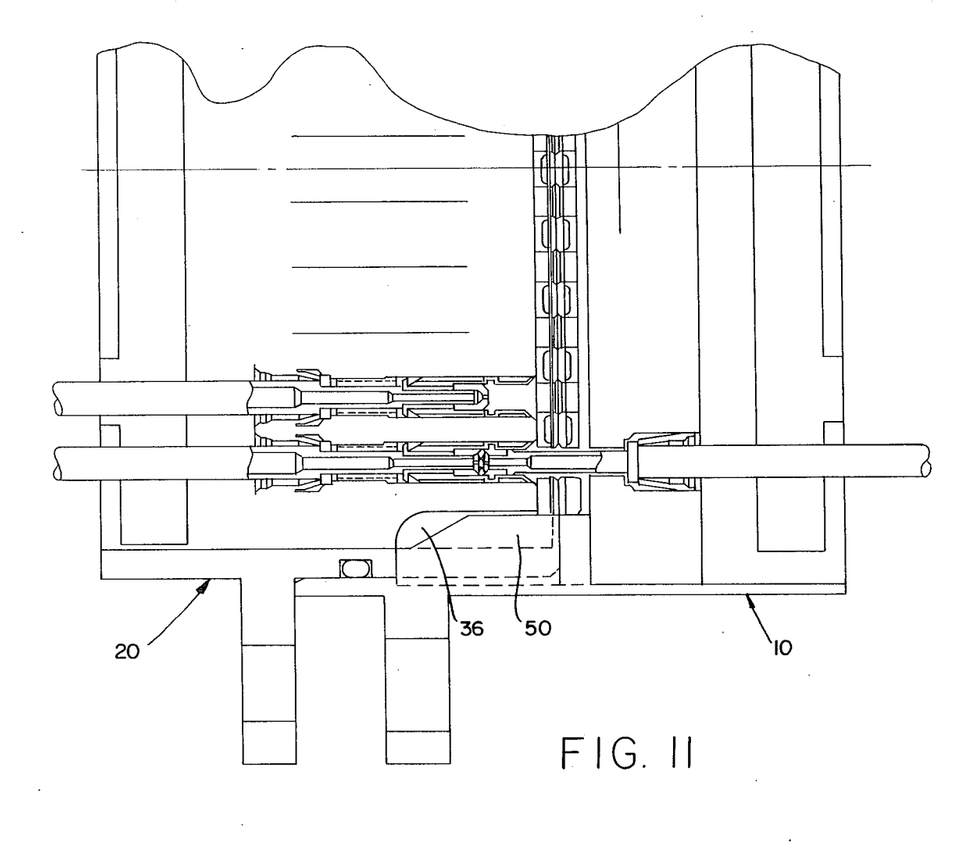

As shown in FIG. 9, as the plug is pushed farther into the receptacle, slide plate 54 is moved to its fully opened position to provide a clear entry for pin contacts 56. For the sake of clarity, FIGS. 9-11 show only the bottom portion of the connectors, and on an enlarged scale. Both slide 54 and fixed plate 74 continue to move rearwardly. The front end of ramp 70 has contacted edge 40 of slide plate 84 and has started to move slide plate 84 laterally (upwards in the drawing) to its open position to expose socket contacts 64.

In FIG. 10, the plug has entered into the receptacle, and slide plate 84 has moved laterally to its open position by virtue of movement of its edge 40 along ramp 70. At this point, apertures 76 and 88 are in alignment with each other, and the slide plate 54.and fixed plate 74 have moved to their rearmost axial position. The forward end of pin contacts 56 is now positioned in openings 76. A clear entry is provided for pin contacts 56 to be inserted into socket contacts 64.

FIG. 11 illustrates the fully mated position wherein the pin contacts have mated with the socket contacts. Opening cam 50 and closing cam 52 (shown in FIG. 8 and others, are now positioned at their forwardmost position in their respective grooves 36, 38 (shown in FIG. 8 and others).

To unmate the connector, plug 20 and receptacle 10 are axially moved away from each other. Closing cam 52 moves slide plate 84 laterally (downwardly in the drawings), after the pin contacts have been removed from the socket contacts, by means of its ramp 72 contacting the end of slide plate 84 opposite to edge 40. Slide plate 84 is eventually moved to its fully closed position. Meanwhile the assembly of fixed plate 74 and slide plate 54 is being urged forwardly by its springs 102. As slide plate 54 is moved forwardly, its edge adjacent to ramp 72 on closing cam 52 rides down the ramp, whereby slide plate 54 is moved to its original blocking position (downwardly in the drawings). When the connectors are demated, the respective contacts are again protected by the protective caps formed by the respective fixed and slide plates.

Returning now to FIG. 4, it will be recalled that recesses 92 are provided in solid sections 90 between openings 88 in slide plate 84. Similar recesses 80 are formed in sections 82 of slide plate 54. Recesses 80, 92 operate to trap foreign matter to thereby eliminate the possibility of such matter sliding inside the connectors. Furthermore, a blast of air or other gas may be used to clean the mating faces of the connectors prior to coupling and the dish shape of recesses 80, 92 enhances movement of dirt axially away from the plates.

Figure 12:
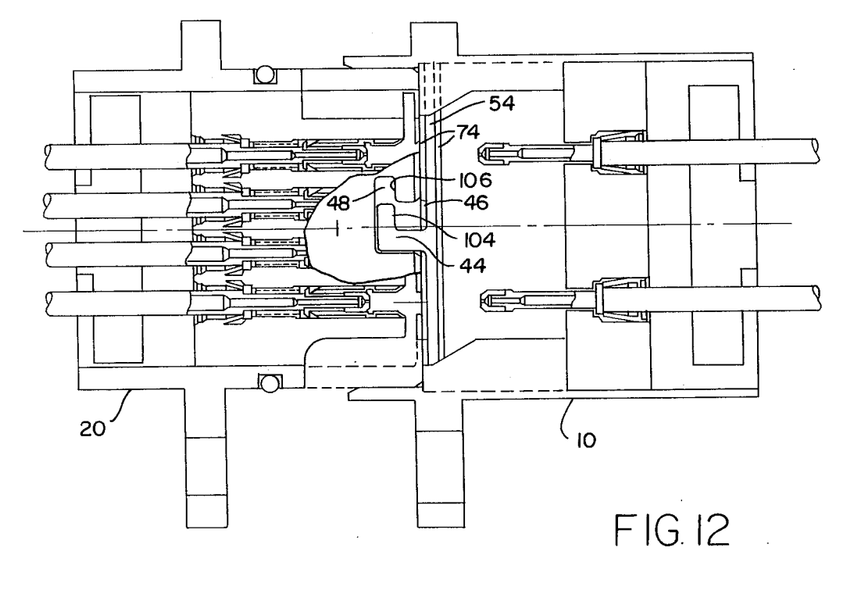
FIGS. 12-15 are views of the connectors moving towards each other during mating, to illustrate the latching arrangement.

The operation of the latches 44 will now be described with reference to FIGS. 12-15. In FIG. 12, the connectors are shown as partially mated, with the plug assembly entering the receptacle assembly. Shoulders 104 are provided on latches 44 and are adapted to engage against edges 106 in latch recesses 48. Latches 44 (only the top one is visible in the drawing) have entered into L-shaped latch recesses 48 (also only one being visible) in plug 20. As mentioned before, latches 44 are fixed to and move with slide plate 54, and extend through slots 46 in fixed plate 74.

Figure 13:
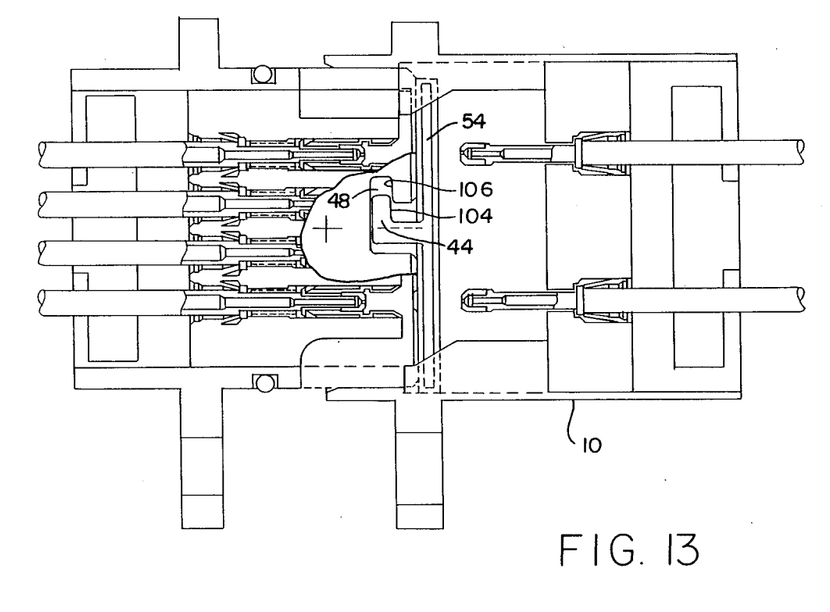
Figure 14:
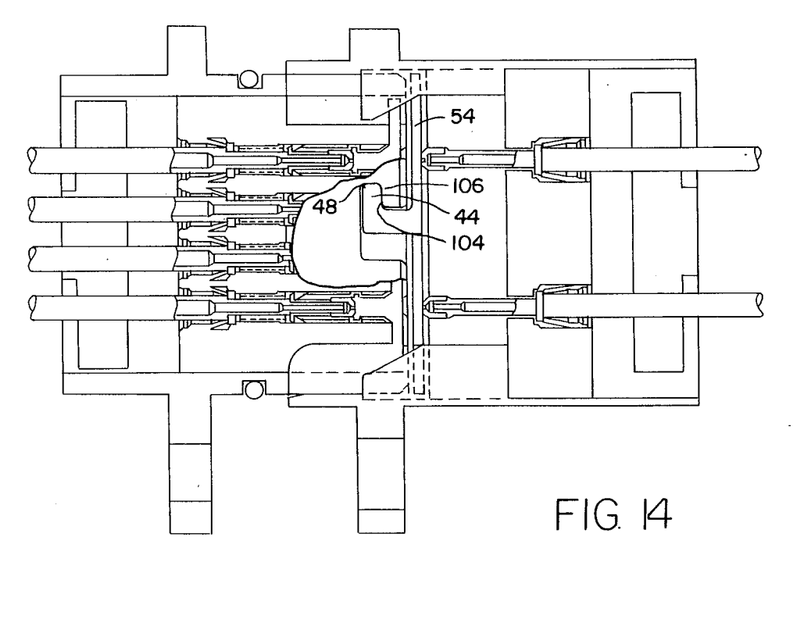

FIG. 13 shows the next step in mating of the connectors, in which the slide assembly of receptacle 10 has moved axially rearward and slide plate 54 has started to move laterally. Such movement causes latches 44 to move laterally in latch recesses 48, with shoulders 104 partially engaging edges 106. In FIG. 14, slide plate 54 has moved to its most lateral extent and latches 44 have fully seated in latch recesses 48, with shoulders 104 engaging edges 106.

Figure 15:
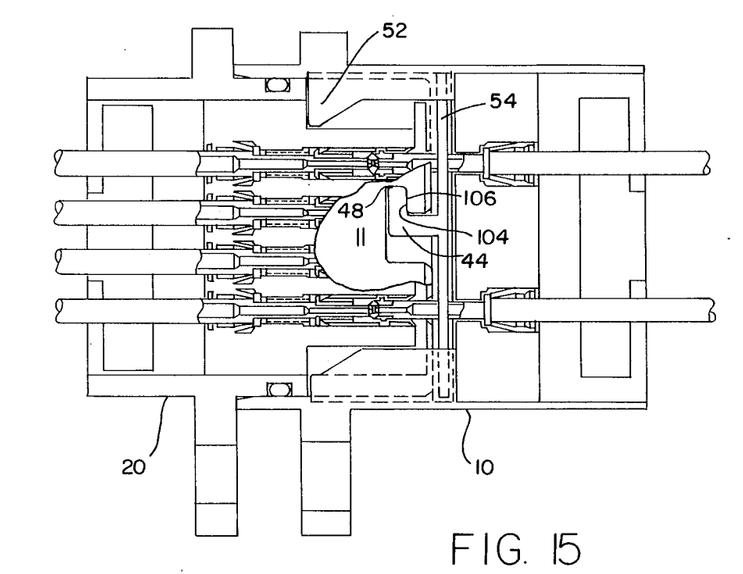

FIG. 15 illustrates the fully mated position of the connectors, with the slide assembly of receptacle 10 having been moved to its axial rearward extent. When the connectors are demated, axial outward displacement of plug 20 pulls the slide assembly of receptacle 10 forward along the axis of the connectors, by virtue of edges 106 acting on shoulders 104. This movement brings closing cam 52 in receptacle 10 into its operable position to move the sliding plates back to their blocking position, closing the apertures. As slide plate 54 moves laterally (downwardly in FIG. 15), latches 44 are moved laterally out of latch recesses 48 until shoulders 104 are clear of edges 106. Thereafter, further axial displacement of the connectors results in removal of latches 44 from latch recesses 48.

The combination of latches 44 and latch recesses 48 aid in the uncoupling of the connectors. This is especially helpful if the connectors have remained in their mated position for some time and may tend to be difficult to be uncoupled due to sticking of the slide members. In addition, the latching function provided by latches 44 and latch recesses 48 prevents the unmating of the connectors without initiating the start of the protective covering operation.

Although springs 98 are preferably used to bias slide plate 54 of receptacle 10 to its blocking position, especially to prevent rattling of an unmated connector during vibration, it is possible to eliminate such springs and rely upon the spring force of springs 102, in combination with ramp 72 on closing cam 52 to move slide plate 54 to its blocking position. In such case, the forward motion of the slide assembly due to springs 102 results in an edge of slide plate 54 riding down ramp 72 so as to be moved vertically downward in the figures to its blocking position.

In addition, it is possible to employ a single cam to open slide plate 54 of receptacle 54 and to eliminate closing cam 52. In such case, springs 98 would be employed to move slide plate 54 to its closed or blocking position.

What is claimed is:
1. A connector assembly comprising mating plug and receptacle connectors, each connector comprising
a housing terminating in a forward end,
a contact support body mounted in said housing,
contact elements mounted in said contact support body and extending towards said forward end of said connector,
a protective plate assembly including a first plate laterally fixed in said housing and a second plate laterally slidable in said housing,
each of said first and second plates having apertures which are offset from one another when said second plate is in a blocking position and the connectors are not mated, so as to protect said contact elements, said second plate being laterally movable upon mating of said connectors to a second position to position said apertures of said plates to be aligned with each other so as to permit the coupling of said contact elements with respective contact elements of the other connector, an opening cam positioned on a lateral side of said housing of one of said connectors for camming the slide plates of each of said connectors to its second, open position, and closing means mounted in said housing of said one of said connectors at a position spaced from said opening cam for moving said slide plate of said one of said connectors to its first, blocking position upon demating of said connectors.

2. The connector assembly of claim 1, including a plurality of recesses on said second plates located between said apertures.

3. The connector assembly of claim 1, wherein said closing means comprises a closing cam fixed in said housing of said one of said connectors for camming the slide plates of said connectors to their first, blocking position.

4. The connector assembly of claim 3, wherein said opening cam and said closing cam are integral with and are located on opposite internal lateral sides of said housing of said receptacle connector.

5. The connector assembly of claim 4, including an inclined ramp on each of said opening cam and said closing cam for contacting opposite edges of said slide plate of said receptacle.

6. The connector assembly of claim 5, including axially extending grooves on lateral surfaces of said plug receptacle, each of said grooves receiving a respective one of said opening and closing cams.

7. The connector assembly of claim 6, wherein said first and second plates of said receptacle connector are movable axially in said housing of said receptacle connector from a first, closed position adjacent to said forward end to a second, open position rearward of said forward end in response to insertion of said plug connector into said receptacle connector.

8. The connector assembly of claim 7, including first spring means mounted in said housing of said receptacle connector for biasing said first and second plates axially forward in said receptacle connector.

9. The connector assembly of claim 8, including second spring means mounted in said housing of said receptacle connector for biasing said second plate of said receptacle connector to its first, closed position.

10. The connector assembly of claim 9, including spring means mounted in said housing of said plug connector for biasing said second plate of said plug connector to its first, closed position.

11. The connector assembly of claim 10, including latch means for assisting in moving said second plates of said connectors to their first, blocking position.

12. The connector assembly of claim 11, including at least one latch mounted on said second plate of said receptacle connector, and at least one latch recess provided in said housing of said plug connector for receiving said latch of said receptacle connector.

13. The connector assembly of claim 12, wherein each of said latch and said latch recess has a substantially L-shape.

14. The connector assembly of claim 13, including a shoulder on said latch and an edge in ssai latch recess, said shoulder and said edge cooperating to close said second plates upon demating of said connectors by an outwardly directed axial force whereby said first and second plates of said receptacle assembly are moved axially forward.

15. The connector assembly of claim 14, including a plurality of recesses on said second plates located between said apertures.

16. A connector assembly comprising mating plug and receptacle connectors, each connector comprising a housing terminating in a forward end, a contact support body mounted in said housing, contact elements mounted in said contact support body and extending towards said forward end of said connector, a protective plate assembly including a first plate laterally fixed in said housing and a second plate laterally slidable in said housing, each of said first and second plates having apertures which are offset from one another when said second plate is in a blocking position and the connectors are not mated, so as to protect said contact elements, said second plate being laterally movable upon mating of second connectors to a second position to position said apertures of said plates to be aligned with each other so as to permit coupling of said contact elements with respective contact elements of the other connector, said protective plate assembly of one of said connectors being axially movable in its housing, and at least one latch mounted on said second plate of said one of said connectors and at least one latch recess provided in said other of said connectors for receiving said latch, said latch and latch recess cooperating in moving said protective plate assembly of said one of said connectors axially forward upon an axially outward movement of one of said connectors associated with demating of said connector assembly.

17. The connector assembly of claim 16, wherein each of said latch and said latch recess has a substantially L-shape.

18. The connector assembly of claim 17, including a shoulder on said latch and an edge in said latch recess, said shoulder and edge cooperating in axially moving said protective plate assembly.

19. The connector assembly of claim 18, wherein said latch is mounted on said second plate of said receptacle connector and said latch recess is provided in a surface in said plug connector.

20. The connector assembly of claim 19, wherein said protective plate assembly of said receptacle is axially movable, and including a slot in said first plate of said receptacle connector, said latch extending through said slot.

21. The connector assembly of claim 20, including opening and closing cams fixed on laterally opposite internal sidewalls of said housing of said receptacle connector, each of said cams including an inclined ramp surface.

22. The connector assembly of claim 21, including spring means biasing said second plates to their blocking positions and spring means biasing said protective plate assembly of said receptacle towards said forward end of said housing.

* * * * *